(12) United States Patent
Park et al.

(10) Patent No.: US 9,013,771 B2
(45) Date of Patent: Apr. 21, 2015

(54) COLOR TEMPERATURE CONVERSION METHOD, MEDIUM, AND APPARATUS CONVERTING A COLOR TEMPERATURE OF A PIXEL BASED ON BRIGHTNESS

(75) Inventors: Dusik Park, Suwon-si (KR); Changyeong Kim, Yongin-si (KR); Soongdeok Lee, Suwon-si (KR); Hoyoung Lee, Suwon-si (KR); Daewon Kim, Yongin-si (KR); Wonhee Choe, Gyeongju-si (KR); Hyunwook Ok, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2021 days.

(21) Appl. No.: 11/066,747

(22) Filed: Feb. 28, 2005

(65) Prior Publication Data

US 2005/0201617 A1  Sep. 15, 2005

(30) Foreign Application Priority Data

Feb. 26, 2004 (KR) ........................ 10-2004-0012988

(51) Int. Cl.
*H04N 1/46* (2006.01)
*G03F 3/08* (2006.01)
*G06F 15/00* (2006.01)
(Continued)

(52) U.S. Cl.
CPC ......... *H04N 9/73* (2013.01); *G09G 2320/0606* (2013.01); *G09G 2320/0666* (2013.01)

(58) Field of Classification Search
USPC ........... 358/500, 518; 382/162, 167; 348/571, 348/655
See application file for complete search history.

(56) References Cited

U.S. PATENT DOCUMENTS 4,562,460 A    12/1985 Harwood
4,633,299 A    12/1986 Tanaka
(Continued)

FOREIGN PATENT DOCUMENTS

EP    1 517 542    3/2005
JP    6-78320    3/1994
(Continued)

OTHER PUBLICATIONS

Do, Hyun-Chul, et al., "Color Reproduction Error Correction for Color Temperature Conversion in PDP-TV," IEEE Transactions on Consumer Electronics, IEEE Inc. New York, vol. 49, No. 3, Aug. 2003, pp. 473-478.

(Continued)

*Primary Examiner* — Ming Hon
(74) *Attorney, Agent, or Firm* — Staas & Halsey LLP

(57) ABSTRACT

A color conversion method, medium, and apparatus, converting a color temperature of an image to a user-set color temperature, on a pixel-by-pixel basis, based on the brightness of each pixel of the image. The color temperature conversion method may include determining a first information associated with a conversion range, determining whether the color temperature of the input pixel needs to be converted by determining, based on the first information, whether the input pixel is within the conversion range, calculating color coordinates of a target point if the input pixel is within the conversion range, and converting the color temperature of the input pixel by moving, in the same direction as the reference point to the target point an amount proportional to the reference point displacement so that the input pixel can be automatically moved along with the reference point of the conversion range.

18 Claims, 5 Drawing Sheets

(51) Int. Cl.
*G06K 1/00* (2006.01)
*H04N 9/73* (2006.01)

(56) References Cited

U.S. PATENT DOCUMENTS

| | | | |
|---|---|---|---|
| 4,685,071 A | | 8/1987 | Lee |
| 4,788,586 A | | 11/1988 | Eckenbrecht |
| 5,293,580 A | * | 3/1994 | Shimizu ........................ 382/243 |
| 5,384,601 A | | 1/1995 | Yamashita et al. |
| 5,495,428 A | | 2/1996 | Schwartz |
| 5,619,229 A | | 4/1997 | Kumaki |
| 6,031,543 A | * | 2/2000 | Miyashita et al. ............ 345/593 |
| 6,476,793 B1 | * | 11/2002 | Motoyama et al. ........... 345/589 |
| 6,504,551 B1 | | 1/2003 | Takashima et al. |
| 2002/0015536 A1 | * | 2/2002 | Warren et al. ................. 382/284 |
| 2002/0031256 A1 | * | 3/2002 | Hiramatsu et al. ............ 382/162 |
| 2002/0126302 A1 | * | 9/2002 | Fukao ............................ 358/1.9 |
| 2003/0091230 A1 | * | 5/2003 | Choi et al. .................... 382/162 |

FOREIGN PATENT DOCUMENTS

| | | |
|---|---|---|
| JP | 9-214792 | 8/1997 |
| JP | 10-326340 | 12/1998 |
| JP | 2000-217127 | 8/2000 |
| JP | 2002-112282 | 4/2002 |
| JP | 2002-223366 | 8/2002 |
| JP | 2005-80313 | 3/2005 |

OTHER PUBLICATIONS

European Search Report, dated Jul. 12, 2005, and issued in corresponding European Patent Application No. 05251022.9-2202.

Japanese Office Action issued Mar. 22, 2011 in corresponding Japanese Patent Application 2005-053512.

* cited by examiner

COLOR TEMPERATURE CONVERSION METHOD, MEDIUM, AND APPARATUS CONVERTING A COLOR TEMPERATURE OF A PIXEL BASED ON BRIGHTNESS

CROSS-REFERENCE TO RELATED APPLICATIONS

This application claims the benefit of Korean Patent Application No. 10-2004-0012988, filed on Feb. 26, 2004, in the Korean Intellectual Property Office, the disclosure of which is incorporated herein in its entirety by reference.

BACKGROUND OF THE INVENTION

1. Field of the Invention

Embodiments of the present invention relate to a color temperature conversion method, medium, and apparatus, and more particularly, to a color temperature conversion method, medium, and apparatus converting a color temperature of an image to a user-set color temperature, on a pixel-by-pixel basis, based on the brightness of each pixel.

2. Description of the Related Art

Conventional image display devices, e.g., those disclosed in U.S. Pat. Nos. 4,562,460, 4,633,299, 4,788,586, and 5,619,229, convert a color temperature of an image by adjusting the hue of the image or individually controlling red, green, and blue (RGB) video signals. Other conventional image display devices, e.g., those disclosed in U.S. Pat. Nos. 4,685,071 and 5,495,428, convert the color temperature of an image by using correlation matrices. However, these conventional image display methods may adversely affect image representations, especially when there is a large difference between a current basic color temperature of a given pixel and a target color temperature. The conventional image display devices convert color temperatures of an image, from the current basic color temperature to the target color temperature, thereby producing color distortions as if the image was forced to pass through a predetermined color filter. Such color distortions of the image may become more apparent in portions of the image representing the human skin, compared to other portions of the image, because people can easily differentiate natural human skin colors from less natural ones.

SUMMARY OF THE INVENTION

Embodiments of the present invention provide color temperature conversion methods, media, and apparatuses that can realize as natural an image, with a desired color temperature, as possible and can minimize color distortions of the image, especially, in portions representing, for example, the human skin, by converting the color temperature of each pixel of the image to another color temperature based on the brightness and hue of each pixel of the image.

Additional aspects and/or advantages of the invention will be set forth in part in the description which follows and, in part, will be obvious from the description, or may be learned by practice of the invention.

According to an aspect of the present invention, there is provided a color temperature conversion method, which receives an image signal including pixels, each having a brightness signal and color difference signals, converting color temperature of an input pixel based on the brightness of the input pixel. The color temperature conversion method may include: determining first information associated with a conversion range; determining whether the color temperature of the input pixel needs to be converted by determining, based on the first information, whether the input pixel is within the conversion range; calculating color coordinates of a target point if the input pixel is within the conversion range; and converting the color temperature of the input pixel by moving, in the same direction as the reference point, to the target point an amount proportional to the reference point displacement so that the input pixel can be automatically moved along with the reference point of the conversion range.

If the conversion range is realized on a color coordinate system as an oval, tilted by a predetermined rotation angle, the first information may include a basic length of the oval, the lengths of the major and minor axis of the oval, and coefficients for a rotation matrix.

The calculating of the color coordinates of the target point may include: obtaining two sample brightnesses, which are very similar to the brightness of the input pixel; receiving a user-set color temperature and obtaining four pairs of sample color coordinates corresponding to combinations of the brightness of the input pixel and the two sample brightnesses; and obtaining the color coordinates of the target point through interpolation by using the two pairs of sample color coordinates.

The basic length of the oval may be obtained by multiplying the brightness of the input pixel by a predetermined coefficient.

If the conversion range is realized on a color coordinate system as an oval which is tilted by a predetermined rotation angle, the converting of the color temperature of the input pixel may include: calculating a distance between the center of the oval and an intersection point between the boundary of the oval and a straight line passing through the center of the oval and a point where the input pixel currently resides; and obtaining color coordinates of a point, to which the input pixel is to be moved when the center of the oval is moved to the target point, by using the distance, color coordinates of the point where the input pixel currently resides, and the color coordinates of the target point.

The calculating of the distance between the center of the oval and the intersection point may include: moving the oval to the origin of the color coordinate system; rotating the oval and the input pixel contained therein by a predetermined angle by using coefficients for a rotation matrix; obtaining color coordinates of an intersection point between the origin of the color coordinate system and a straight line passing through the origin of the color coordinate system and a point, to which the input pixel has been moved after being rotated by the predetermined angle; and calculating a distance between the origin of the coordinate system and the intersection point.

According to another aspect of the present invention, there is provided computer readable code in a medium implementing embodiments of the present invention.

According to another aspect of the present invention, there is provided a color temperature conversion apparatus, which receives an image signal having pixels each having a brightness signal and color difference signals and converts color temperature of an input pixel based on the brightness of the input pixel. The color temperature conversion apparatus may include: a first calculation unit, which calculates first information associated with a conversion range; a determination unit, which receives the image signal and determines whether the color temperature of the input pixel needs to be converted by determining based on the first information whether the input pixel is within the conversion range; a first storage unit, which stores second information including a plurality of sample color temperatures corresponding to different brightnesses and the respective pairs of color coordinates; a second calculation unit, which obtains color coordinates of a target point through interpolation based on the second information read from the storage unit and a user-set color temperature; and a color coordinate conversion unit, converts the color temperature of the input pixel by moving in the same direction as the reference point to the target point in amount proportional to the reference point displacement so that the input pixel can be automatically moved along with the reference point of the conversion range.

The color temperature conversion apparatus may also include a second storage unit, which stores various user-set color temperatures for different brightnesses.

If the conversion range is realized on a color coordinate system as an oval, tilted by a predetermined rotation angle, the first information may include a basic length of the oval, the lengths of the major and minor axis of the oval, and coefficients for a rotation matrix.

The second information may include a plurality of sample color temperatures corresponding to different brightnesses and the respective pairs of color coordinates.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
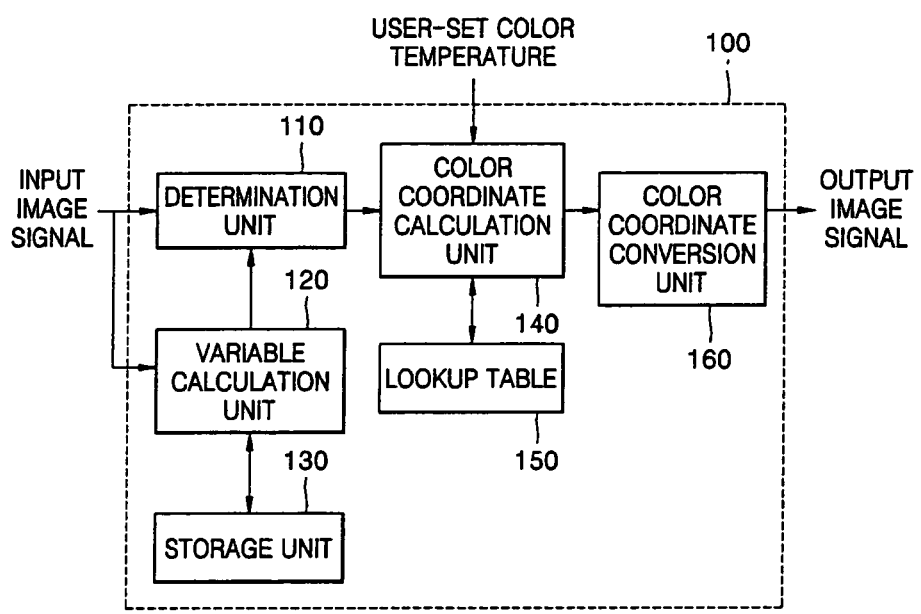
FIG. 1 is a block diagram of a color temperature conversion apparatus, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 is a block diagram of a color temperature conversion apparatus 100, according to an embodiment of the present invention. Referring to FIG. 1, the color temperature conversion apparatus 100 includes a determination unit 110, a variable calculation unit 120, a storage unit 130, a color coordinate calculation unit 140, a lookup table 150, and a color coordinate conversion unit 160.

The determination unit 110 receives an image signal, made up of different pixels, and variables (hereinafter, referred to as conversion range determining variables) for determining a conversion range from the variable calculation unit 120, with the determination unit 110 determining whether a current pixel of the image signal is within the conversion range, i.e., whether the color temperature of the current pixel needs to be converted, based on the conversion range determining variables. Here, each of the pixels of the image signal includes a brightness signal and color difference signals. In addition, the conversion range may be realized as any quadratic curve, in particular, an oval, on a color coordinate system. The conversion range will now be described as being able to be realized as an oval on the color coordinate system.

The variable calculation unit 120 receives the image signal from an external apparatus, receives predetermined information from the storage unit 130, determines the conversion range determining variables by using the predetermined information, and outputs the calculation results to the determination unit 110.

The storage unit 130 stores various adjustment factors, i.e., the conversion range determining variables, and outputs the various adjustment factors to the variable calculator 120.

The color coordinate calculation unit 140 calculates color coordinates of a target point, to which a reference point of the conversion range is to be moved, based on a color temperature (hereinafter, referred to as user-set color temperature) set by a user, and brightness and color difference signals of the current pixel, with reference to the lookup table 150.

The lookup table 150 stores a plurality of basic color temperatures and a plurality of basic brightnesses provided by the image display device and pairs of sample color coordinates corresponding to combinations of the plurality of basic color temperatures and the plurality of basic brightnesses.

The color temperature conversion unit 160 converts the color temperature of the current pixel by moving the reference point of the conversion range to the target point.

Figure 2:
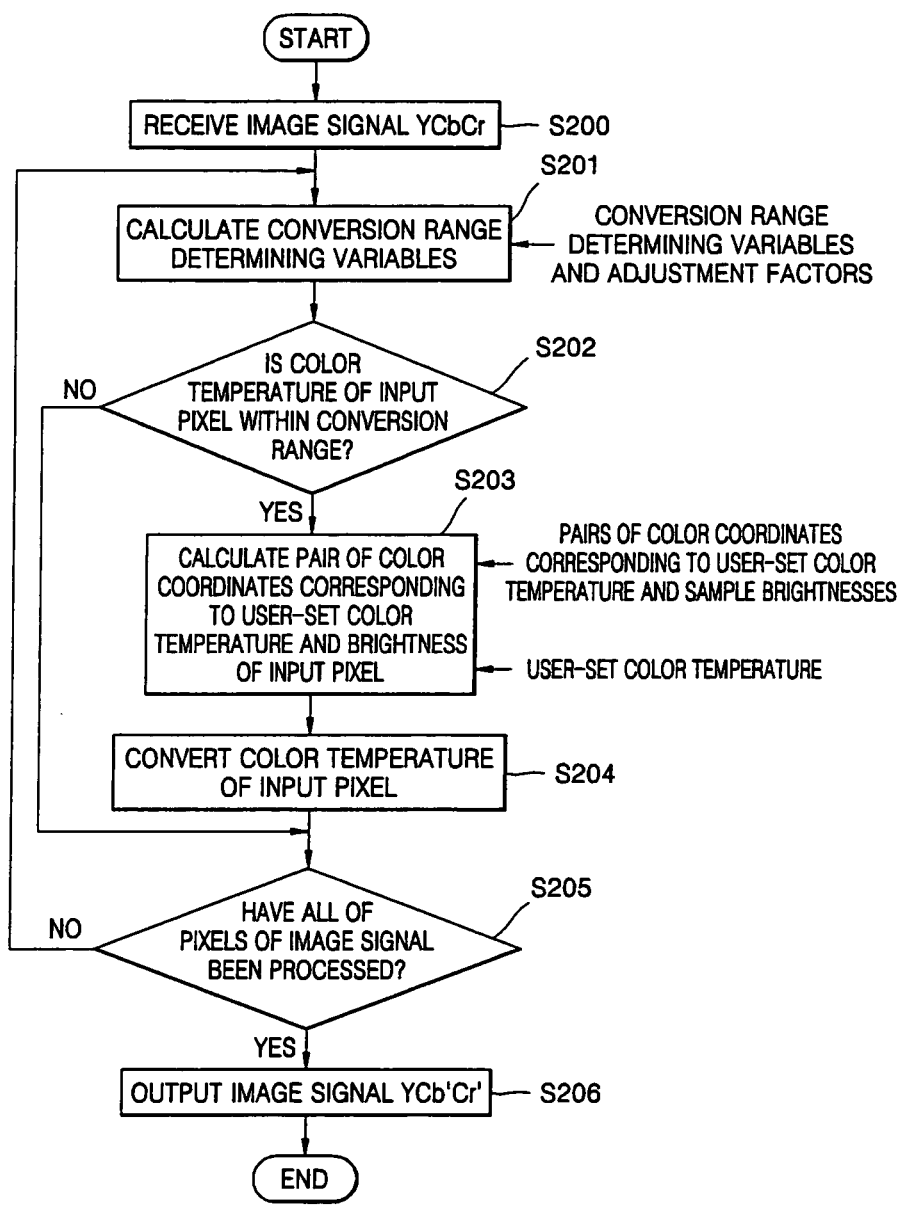
FIG. 2 is a flowchart of a color temperature conversion method, according to an embodiment of the present invention.

FIG. 2 is a flowchart of a color temperature conversion method, according to an embodiment of the present invention. Referring to FIGS. 1 and 2, in operation S200, an image signal is received from the outside of the color temperature conversion apparatus 100. The image signal includes a plurality of pixels, and each of the plurality of pixels has a brightness signal Y and color difference signals Cb and Cr. In operation S201, the variable calculation unit 120 receives predetermined information from the storage unit 130 and determines conversion range determining variables by using the predetermined information. The storage unit 130 stores various adjustment factors for determining conversion range determining variables, i.e., adjustment factors for a length of a major axis of the oval conversion range and for a length of a minor axis of the oval conversion range, an angle of the major axis of the oval conversion range relative to the X axis of the color coordinate system, and a brightness scaling factor. Adjustment factors are shown in Table 1 below.

TABLE 1

| Index | Adjustment factors | Constants |
|---|---|---|
| 1 | Adjustment factor for length of major axis of oval | α |
| 2 | Adjustment factor for length of minor axis of oval | β |
| 3 | Angle of major axis of oval with X-axis | θ |
| 4 | Brightness scaling factor | K |

Operation S201 will now be described in greater detail.

Firstly, a basic length Base_Dist of the oval is calculated by using Equation (1) below:

$$Base\_Dist = k \times Y \quad (1),$$

where k denotes a constant for determining Base_Dist, and Y denotes the brightness of the current pixel.

Second, the length a of the major axis of the oval is calculated by using Equation (2) below:

$$a = \alpha \times Base\_Dist \quad (2),$$

where α denotes a constant for determining a.

Third, the length b of the minor axis of the oval is calculated by using Equation (3) below:

$$b = \beta \times a \quad (3),$$

where β denotes a constant for determining b.

Fourthly, coefficients $m_1$ and $m_2$ for a rotation matrix are determined by using the angle θ of the major axis of the oval, relative to the X-axis of the color coordinate system, which is expressed by Equations (4) and (5) below:

$$m_1 = \cos(-\theta) \quad (4)$$

$$m_2 = \sin(-\theta) \quad (5)$$

Fifthly, an inverse number f of the square of the length a of the major axis of the oval is calculated by using Equation (6) below:

$$f = \frac{1}{a^2} \quad (6)$$

Sixthly and finally, an inverse number g of the square of the length b of the minor axis of the oval is calculated by using Equation (7) below:

$$g = \frac{1}{b^2} \quad (7)$$

In operation S202, the determination unit 110 determines whether the current pixel is within the conversion range, based on the conversion range determining variables. Operation S202 will now be described in further detail.

Firstly, the image signal is received, and each and every one of the pixels of the image signal is processed. Secondly, the conversion range determining variables $m_1$, $m_2$, f, and g, which are determined by the variable calculation unit 120, are received. Thirdly, supposing P(x, y) denotes a current location of the current pixel on the color coordinate system, and $P_1(p_{1x}, p_{1y})$ denotes a point obtained by moving P, color coordinates $p_{1x}$ and $p_{1y}$ of $P_1(p_{1x}, p_{1y})$ are respectively obtained by using Equations (8) and (9):

$$p_{1x} = m_1 \times x - m_2 \times y \quad (8)$$

$$p_{1y} = m_2 \times x - m_1 \times y \quad (9).$$

Fourthly and finally, it is determined whether the current pixel is within the conversion range, i.e., whether the color temperature of the current pixel needs to be converted, by using Inequality (10). In other words, if the current pixel satisfies Inequality (10), the current pixel is determined as being within the conversion range. Otherwise, the current pixel is determined as being beyond the conversion range, and the entire color temperature conversion method is completed. Thereafter, another round of color temperature conversion is performed on a subsequent pixel.

$$f \times p_{1x} + g \times p_{1y} \leq 1 \quad (10)$$

In operation S203, the color coordinate calculation unit 140 calculates color coordinates (hereinafter, referred to as target color coordinates) of a target point, to which the center of the conversion range is to be moved, based on the brightness signal of the current pixel and a user-set color temperature with reference to the lookup table 150. Table 2 below is an example of the lookup table 150.

TABLE 2

| Index | Brightness | T1 | T2 | ... | TM − 1 | TM |
|---|---|---|---|---|---|---|
| 1 | Y1 | Cb1_T1, Cr1_T1 | Cb1_T2, Cr1_T2 | ... | Cb1_TM − 1, Cr1_TM − 1 | Cb1_TM, Cr1_TM |
| 2 | Y2 | Cb2_T1, Cr2_T1 | Cb2_T2, Cr2_T2 | ... | Cb2_TM − 1, Cr2_TM − 1 | Cb2_TM, Cr2_TM |
| 3 | Y3 | Cb3_T1, Cr3_T1 | Cb3_T2, Cr3_T2 | ... | Cb3_TM − 1, Cr3_TM − 1 | Cb3_TM, Cr3_TM |
| 4 | Y4 | Cb4_T1, Cr4_T1 | Cb4_T2, Cr4_T2 | ... | Cb4_TM − 1, Cr4_TM − 1 | Cb4_TM, Cr4_TM |
| ... | ... | ... | ... | ... | ... | ... |
| N − 1 | YN − 1 | CbN − 1_T1, CrN − 1_T1 | CbN − 1_T2, CrN − 1_T2 | ... | CbN − 1_TM − 1, CrN − 1_TM − 1 | CbN − 1_TM, CrN − 1_TM |
| N | YN | CbN_T1, CrN_T1 | CbN_T2, CrN_T2 | ... | CbN_TM − 1, CrN_TM − 1 | CbN_TM, CrN_TM |

The calculation of the target color coordinates will now be described in further detail with reference to Table 2.

Firstly, supposing that the current pixel has a brightness Y, two sample brightnesses $Y_l$ and $Y_h$, which satisfy Inequality (11) below, are selected from among a plurality of sample brightnesses stored in the first lookup table 150:

$$Y_l < Y \leq Y_h \quad (11)$$

Every two consecutive brightnesses, among the plurality of sample brightnesses, have a predetermined difference, and each of the plurality of sample brightnesses has a fixed value. If each of the plurality of sample brightness signals is 8-bit data, it may be set to a value between 0 and 255. For example, the lookup table 150 may have a total of 16 sample brightness signals (i.e., N=16) having a difference of 16 thereamong. If the 16 sample brightness signals are 0, 16, 32, 48, 64, 80, . . . , 240, and the brightness signal Y of the current pixel is 37, then the two selected sample brightness signals $Y_l$ and $Y_h$ are 32 and 48, respectively.

Secondly, two sample color temperatures, which satisfy Inequality (12) below, are selected from among a plurality of sample color temperatures provided by the lookup table 150:

$$T_l < T_u \leq T_h \quad (12)$$

Figure 3:
FIG. 3 is a diagram illustrating color temperature-based interpolation of target color coordinates between pairs of sample color coordinates.

Thirdly, if the brightness Y of the current pixel is the same as one of the plurality of sample brightnesses, then there is no need to obtain the brightness of the current pixel through interpolation by using the two sample brightnesses $Y_l$ and $Y_h$, pairs of sample color coordinates ($Cb_{Tl}$, $Cr_{Tl}$) and ($Cb_{Th}$, $Cr_{Th}$), respectively corresponding to combinations of the brightness Y of the current pixel and the selected sample color temperatures $T_l$ and $T_h$, as they can be obtained from the lookup table 150. In this case, target color coordinates ($Cb_{Tu}$, $Cr_{Tu}$) corresponding to a combination of the brightness Y of the current pixel and the user-set color temperature $T_u$ are obtained through interpolation by using the pairs of sample color coordinates ($Cb_{Tl}$, $Cr_{Tl}$) and ($Cb_{Th}$, $Cr_{Th}$) and weight values $W_{tl}$ and $W_{th}$. The weight values $W_{tl}$ and $W_{th}$ can be calculated by taking advantage of differences between $T_u$ and $T_l$ and between $T_u$ and $T_h$, which is expressed by Equations (13) and (14) below. The color coordinates $Cb_{Tu}$ and $Cr_{Tu}$ can then be obtained by using the below Equations (15) and (16), respectively. FIG. 3 illustrates such color temperature-based interpolation of the target color coordinates $(Cb_{Tu}, Cr_{Tu})$ between the two pairs of sample color coordinates $(Cb_{Tl}, Cr_{Tl})$ and $(Cb_{Th}, Cr_{Th})$.

$$W_{tl} = \frac{T_h - T_u}{T_h - T_l} \tag{13}$$

$$W_{th} = \frac{T_u - T_l}{T_h - T_l} \tag{14}$$

$$Cb_{Tu} = W_{tl} \times Cb_{Tl} + W_{th} \times Cb_{Th} \tag{15}$$

$$Cr_{Tu} = W_{tl} \times Cr_{Tl} + W_{th} \times Cr_{Th} \tag{16}$$

Figure 4:
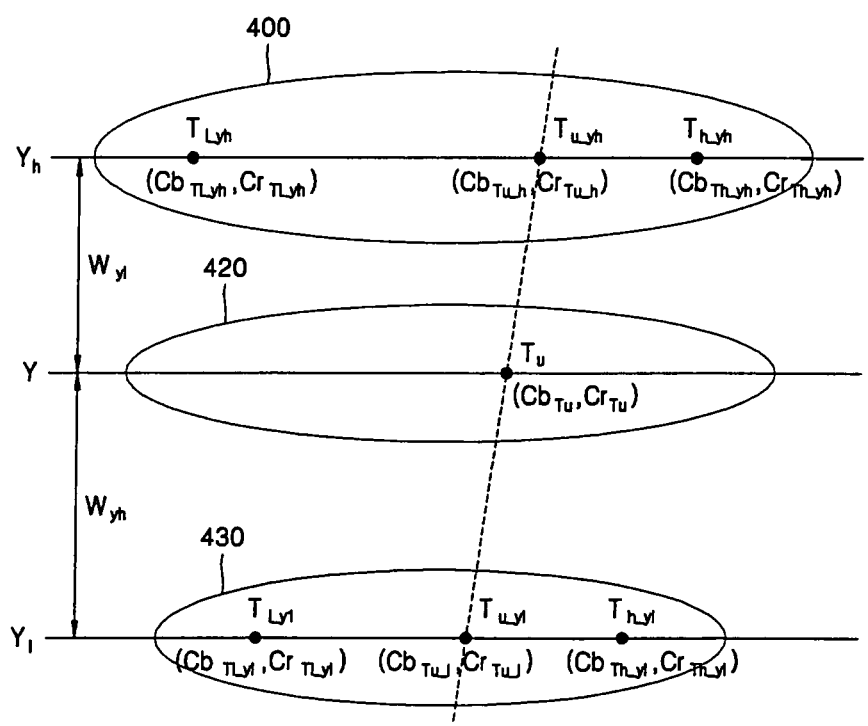
FIG. 4 is a diagram illustrating pixel brightness-based interpolation of target color coordinates between pairs of sample color coordinates.

On the other hand, if the brightness Y of the current pixel is not the same as any of the plurality of sample brightnesses, there is the need to obtain the brightness of the current pixel through interpolation by using the two sample brightnesses $Y_l$ and $Y_h$, and then the target color coordinates $(Cb_{Tu\_yl}, Cr_{Tu\_yl})$ corresponding to the combination of the user-set color temperature Tu and the brightness Y of the current pixel can be obtained through interpolation by using two pairs of sample color coordinates, i.e., $(Cb_{Tu\_yh}, Cr_{Tu\_yh})$ corresponding to a combination of the user-set color temperature $T_u$ and the sample brightness $Y_l$ and $(Cb_{Tu\_h}, Cr_{Tu\_h})$ corresponding to a combination of the user-set color temperature $T_u$ and the sample brightness $Y_h$, and weight values $W_{yl}$ and $W_{yh}$. The weight values $W_{yl}$ and $W_{yh}$ are obtained by taking advantage of differences between Y and $Y_l$ and between Y and $Y_h$. The weight values $W_{yl}$ and $W_{yh}$ can be calculated by using Equations (17) and (18) below, respectively, and the target color coordinates $Cb_{Tu}$ and $Cr_{Tu}$ can be obtained by using Equations (19) and (20), respectively. The interpolation of the target color coordinates $(Cb_{Tu}, Cr_{Tu})$ between $(Cb_{Tu\_l}, Cr_{Tu\_l})$ and $(Cb_{Tu\_h}, Cr_{Tu\_h})$ is illustrated in FIG. 4. The color coordinates $Cb_{Tu}$ and $Cr_{Tu}$ in Equations (15) and (16) are different from their respective counterparts in Equations (19) and (20) below. That is to say, the color coordinates $Cb_{Tu}$ and $Cr_{Tu}$ in Equations (15) and (16) are interpolated based on one brightness, while the color coordinates $Cb_{Tu}$ and $Cr_{Tu}$ in Equations (19) and (20) are interpolated based on two brightnesses.

$$W_{yl} = \frac{Y_h - Y}{Y_h - Y_l} \tag{17}$$

$$W_{yh} = \frac{Y - Y_l}{Y_h - Y_l} \tag{18}$$

$$Cb_{Tu} = W_{yl} \times CbT_{u\_yl} + W_{yh} \times CbT_{u\_yh} \tag{19}$$

$$Cr_{Tu} = W_{yl} \times CrT_{u\_yl} + W_{yh} \times CrT_{u\_yh} \tag{20}$$

In operation S204, the color temperature conversion unit 160 converts the color temperature of the current pixel by moving the reference point (e.g., the center) of the conversion range to the target point. Operation S204 will now be described in further detail.

Firstly, it is determined whether both of color coordinates x and y of a point P, at which the current pixel currently resides, have a value of 0. If both of the color coordinates x and y of the current pixel have a value of 0, i.e., if x=y=0, color coordinates x' and y' of a P', to which the current pixel is to be automatically moved along with the center of the conversion range, are simply replaced with the respective target color coordinates $T_u(Cb_{Tu}, Cr_{Tu})$. In other words, $x'=Cb_{Tu}$, and $y'=Cr_{Tu}$. Thereafter, the entire color conversion process for the current pixel is completed without the need to perform additional processes on the current pixel, and then another round of color conversion is performed on a subsequent pixel.

Secondly, unless both of the color coordinates x and y of the point P have a value of 0, a distance r between the center of the conversion range and a point on the boundary of the conversion range, at which a predetermined straight line drawn from the center of the conversion range through a point $P_1(p_{1x}, p_{1y})$ obtained by rotating P terminates, is calculated by using Equation (21) below:

$$r = \sqrt{x_c^2 + y_c^2} = \sqrt{\frac{1 + B^2}{f + gB^2}}, \tag{21}$$

where B denotes a gradient of the predetermined straight line, and $$B = \frac{p_{1y}}{p_{1x}},$$

and $(x_c, y_c)$ denote a pair of color coordinates at an intersection point between the predetermined straight line and the conversion range. Here, the predetermined straight line can be represented by the following equation: y=Bx. If $p_{1x}=0$ and $p_{1y} \neq 0$, $$r = \frac{1}{g}.$$

If $p_{1y}=0$ and $p_{1x} \neq 0$, $$r = \frac{1}{f}.$$

Thirdly, the weight $W_m$ is calculated by using Equation (22) below:

$$W_m = \frac{r\|P\|}{r} = \frac{r\sqrt{x^2 + y^2}}{r}, \tag{22}$$

where P denotes the point at which the current pixel currently resides.

Fourthly, the color coordinates x' and y' of the point P', to which the current pixel is to be moved from, are calculated by using Equation (23) below:

$$P' = \begin{pmatrix} x' \\ y' \end{pmatrix} = \begin{pmatrix} x \\ y \end{pmatrix} + W_m \times \begin{pmatrix} x_t \\ y_t \end{pmatrix}, \tag{23}$$

where x, and y, correspond to the target color coordinates $Cb_{Tu}$ and $Cr_{Tu}$, respectively, obtained in operation S203.

In operation S205, it is determined whether all of the pixels of the image signal have gone through the above-described operations, i.e., operations S200 through S204. If all of the pixels of the image signal have already been processed, the color conversion method is completed. Otherwise, operations S200 through S204 are repeated until no pixels of the image signal are left unprocessed.

Figure 5:
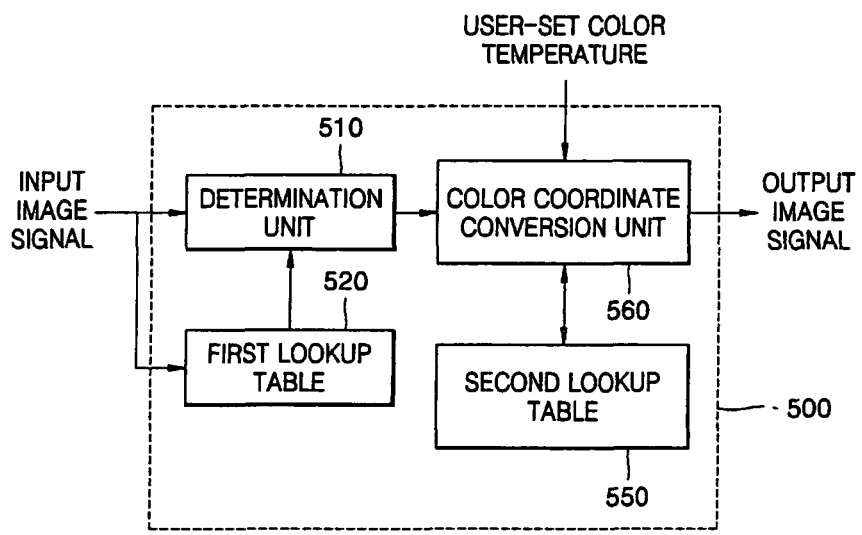
FIG. 5 is a block diagram of a color temperature conversion apparatus, according to another embodiment of the present invention.

FIG. 5 is a block diagram of a color temperature conversion apparatus 500, according to another embodiment of the present invention. Referring to FIG. 5, the color temperature conversion apparatus 500 includes a determination unit 510, a first lookup table 520, a second lookup table 550, and a color coordinate conversion unit 560. The color temperature conversion apparatus 500, unlike the color temperature conversion apparatus 100 of FIG. 1, does not need any calculation units. So, the color temperature conversion apparatus 500 includes all data that it needs, stored in the first and second lookup tables 520 and 550, rather than having to obtain it through calculations like the color temperature conversion apparatus 100.

The determination unit 510 receives a set of conversion range determining variables from the first lookup table 520.

The first lookup table 520 stores a plurality of pixel brightnesses and the respective sets of conversion range determining variables and provides one of the sets of conversion range determining variables corresponding to the brightness of a current pixel to the determination unit 510. An example of the first lookup table 520 is shown in Table 3 below.

TABLE 3

| Index | Brightness | Conversion range determining variables |
|---|---|---|
| 1 | $Y_1$ | $m_{1\_1}, m_{1\_2}, f_1, g_1$ |
| 2 | $Y_2$ | $M_{2\_1}, m_{2\_2}, f_2, g_2$ |
| 3 | $Y_3$ | $M_{3\_1}, m_{3\_2}, f_3, g_3$ |
| 4 | $Y_4$ | $M_{4\_1}, m_{4\_2}, f_4, g_4$ |
| ... | ... | ... |
| N − 1 | $Y_{N-1}$ | $M_{N-1\_1}, m_{N-1\_2}, f_{N-1}, g_{N-1}$ |
| N | $Y_N$ | $M_{N\_1}, m_{N\_2}, f_N, g_N$ |

Since the first lookup table 520 cannot store all possible pixel brightnesses and the respective sets of conversion range determining variables, it may search the plurality of pixel brightnesses for the closest one to the brightness of the current pixel, and then may transmit a corresponding one of the sets of conversion range determining variables corresponding to the searched pixel brightness to the determination unit 510 if there is no match for the brightness of the current pixel among the plurality of pixel brightness stored in the first lookup table 520.

The color coordinate conversion unit 560 receives target color coordinates from the second lookup table 550 and then converts the color temperature of the input pixel by moving, in the same direction as the reference point of a conversion range, to a point indicated by the target color coordinates in amount proportional to the reference point displacement, the process being similar to the processes discussed above for FIGS. 1 and 2.

In short, the color temperature conversion apparatus 500 obtains the conversion range determining variables and the target color coordinates from the first and second lookup tables 520 and 550, while the color temperature conversion apparatus 100 of FIG. 1, alternatively, itself calculates the conversion range determining variables and obtains the target color coordinates through interpolation by using pairs of sample color coordinates. Therefore, the color temperature conversion apparatus 100 can be implemented with a smaller storage capacity than the color temperature conversion apparatus 500. However, the color temperature conversion apparatus 100 requires more time than the color temperature conversion apparatus 500 to obtain the target color coordinates because it has to perform a considerable amount of computations.

Figure 6:
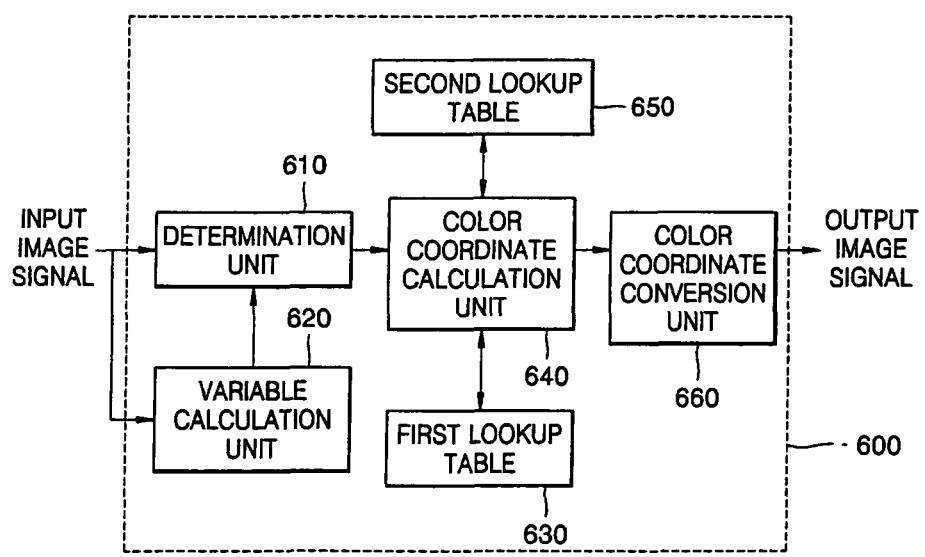
FIG. 6 is a block diagram of a color temperature conversion apparatus, according to still another embodiment of the present invention.

FIG. 6 is a block of a color temperature conversion apparatus 600, according to still another embodiment of the present invention. Referring to FIG. 6, the color temperature conversion apparatus 600 includes a determination unit 610, a variable calculation unit 620, a first lookup table 630, a color coordinate calculation unit 640, a second lookup table 650, a color coordinate conversion unit 660, and a storage unit 670.

The color temperature conversion apparatus 600 includes elements of the color temperature conversion apparatus 100 and further includes the first lookup table 630, while the color coordinate calculation unit 640 of FIG. 6 does not perform the same as the color coordinate calculation unit 140 of FIG. 1. An example of the first lookup table 630 is shown in Table 4 below.

TABLE 4

| Index | Brightness | Color temperature |
|---|---|---|
| 1 | $Y_1$ | $T_{1\_t}$ |
| 2 | $Y_2$ | $T_{2\_t}$ |
| 3 | $Y_3$ | $T_{3\_t}$ |
| 4 | $Y_4$ | $T_{4\_t}$ |
| ... | ... | ... |
| N − 1 | $Y_{N-1}$ | $T_{N-1\_t}$ |
| N | $Y_N$ | $T_{N\_t}$ |

The operation of the color temperature conversion apparatus 600 will now be described in further detail.

Firstly, supposing that a current pixel has a brightness Y, two sample brightnesses $Y_l$ and $Y_h$, which satisfy Inequality (24) below, are selected from among a plurality of sample brightnesses stored in the first lookup table 630.

$$Y_l < Y \leq Y_h \quad (24)$$

Each of the two sample brightnesses $Y_l$ and $Y_h$ has a fixed value. If the two sample brightnesses $Y_l$ and $Y_h$ are 8-bit data, they may have a value between 0 and 255. For example, the first lookup table 630 may store a total of 16 sample brightness signals (i.e., N=16), and every two consecutive sample brightnesses among the plurality of sample brightnesses may have a predetermined difference therebetween. If the 16 sample brightness signals are 0, 16, 32, 48, 64, 80, ..., 240, and the brightness signal Y of the current pixel is 37, then the two selected sample brightness signals $Y_l$ and $Y_h$ may be 32 and 48, respectively.

Secondly, user-set color temperatures $T_{l\_t}$ and $T_{h\_t}$, respectively corresponding to the two sample brightnesses $Y_l$ and $Y_h$, are obtained from the second lookup table 650. Sample color temperatures $T_{l\_l}$ and $T_{l\_h}$ for the user-set color temperature $T_{l\_t}$ which satisfy Inequality (25) below, and sample color temperatures $T_{h\_l}$ and $T_{h\_h}$ for the user-set color temperature $T_{h\_t}$, which satisfy Inequality (26) below, are obtained from the second lookup table 650.

$$T_{l\_l} < T_{l\_t} \leq T_{l\_h} \text{ for } Y_l \quad (25)$$

$$T_{h\_l} < T_{h\_t} \leq T_{h\_h} \text{ for } Y_h \quad (26)$$

Thirdly, two pairs of sample color coordinates ($Cb_{Tu\_l}$, $Cr_{Tu\_l}$) and ($Cb_{Tu\_h}$, $Cr_{Tu\_h}$), respectively corresponding to a combination of $Y_l$ and $T_{l\_t}$ and a combination of $Y_h$ and $T_{h\_t}$, can be obtained by using Equations (13) through (16) above.

Fourthly and finally, weight values can be obtained by using differences between the brightness Y of the current pixel and the two sample brightnesses $Y_l$ and $Y_h$, as shown in Equations (17) and (18), and then a pair of target color coordinates corresponding to a combination of the brightness Y of the current pixel and a user-set color temperature $T_u$ are obtained by using the two pairs of sample color coordinates ($Cb_{Tu\_l}$, $Cr_{Tu\_l}$) and ($Cb_{Tu\_h}$, $Cr_{Tu\_h}$) and the weight values, as shown in Equations (19) and (20) above.

The color temperature conversion apparatus 600 obtains a user-set color temperature from the first lookup table 630, rather than receiving it from the outside. Therefore, the color temperature conversion apparatus 600 can result in pixels with different brightnesses having different color temperatures. In addition, the color temperature conversion apparatus 600 may be designed to receive a user-set color temperature from the outside and then convert pixels with different brightnesses to have different color temperatures by taking advantage of the relationships between the user-set color temperature and other user-set color temperatures, which are stored in the first lookup table 630 and correspond to the different pixel brightnesses.

Figure 7:
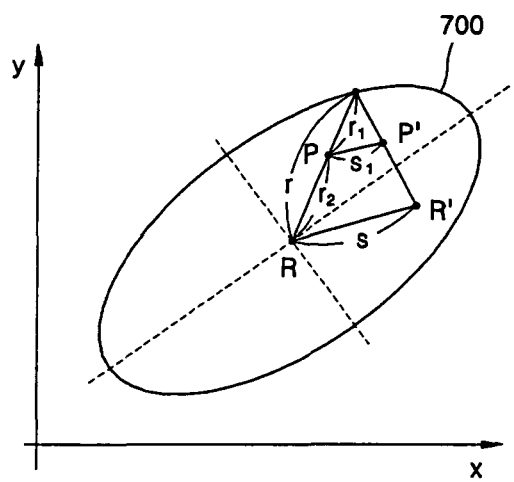
FIG. 7 is a diagram illustrating a relationship between color coordinates of a point, at which a current pixel currently resides, and color coordinates of another point to which the current pixel is to be moved from the point after the color temperature of the current pixel is converted.
Figure 8:
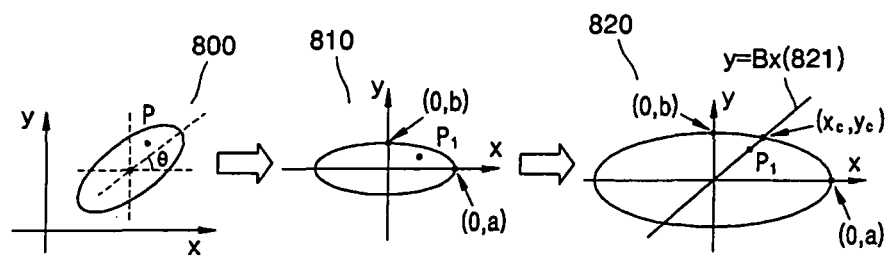
FIG. 8 is a diagram illustrating a process of calculating r of FIG. 7.

FIG. 7 is a diagram illustrating the movement of an input pixel on a color coordinate system, as a result of user-set color temperature-based color temperature conversion by moving of the, so called, mass point in ellipse (MMPE), and FIG. 8 is a diagram illustrating a process of obtaining a distance r between the center R of a conversion range and a point on the boundary of the conversion range, at which a predetermined straight line drawn from the center of the conversion range through a point $P_1(p_{1x}, p_{1y})$ terminates.

The process of obtaining color coordinates of a point P'(x', y') on the color coordinate system, to which the input pixel is to be transferred from a point P(x, y), where it currently resides, will now be described in further detail with reference to FIG. 8.

Referring to FIG. 7, if both the point P and a target point R', to which a reference point R of a conversion range 700 is to be transferred after color temperature conversion is performed, exist within the conversion range 700, it is possible to calculate color coordinates of a point P', to which the point P is to be automatically moved along with the reference point R of the conversion range 700.

A distance s between the reference point R and the target point R' is obtained by using Equation (27) below:

$$(P'-P)=a(R'-R) \qquad (27)$$

Equation (27) can be rearranged into Equation (28) below:

$$a = \frac{\|P-P'\|}{\|R-R'\|} = \frac{s_1}{s} = \frac{r_1}{r}, \qquad (28)$$

where $r=r_1+r_2=r_1+\|P-R\|$. Accordingly, the point P' can be obtained by using Equation (29) below:

$$P' = P + \frac{r_1}{r}(R'-R) = P + \frac{r-\|P-R\|}{r}(R'-R) \qquad (29)$$

As shown in Equation (29), P' is determined by R, R', P, and r. Thus, there is a need to calculate r in order to calculate P'. If the conversion range 700 is circular, r is always the same as the radius of the conversion range 700, which makes the calculation of P' easier.

Referring to FIG. 8, the center of a conversion range 800, which is oval and is tilted by a predetermined angle θ, is moved to the origin of a color coordinate system (810) so that the major and minor axes of the conversion range 800 is parallel to the X- and Y-axes, respectively, and then a distance r between the center of the conversion range 800 and an intersection point ($x_c$, $y_c$) between the boundary of the conversion range and a straight line 821 is calculated (820). The straight line 821 passes through the center of the conversion range 800 and a point $P_1$ obtained by rotating P by θ.

The conversion range 800 can be expressed by the following equation: $fx^2+gy^2=1$ where $$f = \frac{1}{a^2}, \text{ and } g = \frac{1}{b^2}.$$

The distance r can be obtained by using Equation (30) below:

$$r = \sqrt{x_c^2 + y_c^2} = \sqrt{\frac{1+B^2}{f+gB2}} \qquad (30)$$

As described above, it is possible to realize any color temperature that a user wants for the brightness of each pixel of an image and minimizing color distortions of the image.

Embodiments of the present invention may be implemented through computer readable coding/instructions in a medium, e.g., a computer-readable medium, including but not limited to storage media such as magnetic storage media (ROMs, RAMs, floppy disks, magnetic tapes, etc.), optically readable media (CD-ROMs, DVDs, etc.), and carrier waves (e.g., transmission over the internet). The present invention may also be embodied as a medium having a computer-readable code embodied therein for causing a number of computer systems connected via a network to effect distributed processing. The functional programs, codes and code segments for embodying the present invention may be easily deducted by programmers in the art which the present invention belongs to in view of the above disclosure.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A color temperature conversion method for an image signal having pixels, each pixel having a brightness signal and color difference signals, converting a color temperature of an input pixel based on a brightness of the input pixel, the color temperature conversion method comprising:
   determining first information associated with a conversion range at a first calculation unit;
   determining whether the color temperature of the input pixel needs to be converted by determining whether the input pixel is within the conversion range, based on the first information at a determination unit;
   calculating color coordinates of a target point based on a brightness signal of the input pixel and a user-set color temperature, if the input pixel is within the conversion range at a color coordinate calculation unit; and
   converting the color temperature of the input pixel by moving the input pixel in a direction same as the direction from a reference point of the conversion range to the target point, in an amount proportional to a displacement from the reference point to the target point at a color temperature conversion unit, the reference point being a center of the conversion range, the amount being determined using coordinates of the input pixel, the displacement from the reference point to the target point, a distance between the reference point and an intersection point between a boundary of the conversion range and a straight line passing through the reference point and a point where the input pixel currently resides, and a distance between the input pixel and the intersection point, wherein the target point is a point to which the reference point of the conversion range is transferred, the input pixel and the target point existing within the conversion range.

2. The color temperature conversion method of claim 1, wherein if the conversion range is realized on a color coordinate system as an oval, which is tilted by a predetermined rotation angle, the first information comprises a basic length of the oval, lengths of the major and minor axis of the oval, and coefficients for a rotation matrix.

3. The color temperature conversion method of claim 2, wherein the basic length of the oval is obtained by multiplying the brightness of the input pixel by a predetermined coefficient.

4. The color temperature conversion method of claim 1, wherein the conversion range is realized on a color coordinate system as an oval and the converting of the color temperature includes moving the oval based on the target point and rotating the oval such that major and minor axis of the oval are respectively parallel to x and y axis corresponding to the coordinates of the target point coordinates.

5. A non-transitory computer-readable medium comprising computer readable code implementing the color temperature conversion method of claim 4.

6. The color temperature conversion method of claim 1, wherein the calculating of the color coordinates of the target point comprises:
obtaining two sample brightnesses similar to the brightness of the input pixel;
receiving a user-set color temperature and obtaining four pairs of sample color coordinates corresponding to combinations of the brightness of the input pixel and the two sample brightnesses; and
obtaining color coordinates of the target point through interpolation using the two pairs of sample color coordinates.

7. A non-transitory computer-readable medium comprising computer readable code implementing the color temperature conversion method of claim 6.

8. The color temperature conversion method of claim 1, wherein if the conversion range is realized on a color coordinate system as an oval, tilted by a predetermined rotation angle, the converting of the color temperature of the input pixel further comprises:
calculating a distance between a center of the oval and an intersection point between a boundary of the oval and a straight line passing through the center of the oval and a point where the input pixel currently resides; and
obtaining color coordinates of a point, to which the input pixel is to be moved when the center of the oval is moved to the target point, by using the distance obtained in the calculating, color coordinates of the point where the input pixel currently resides, and the color coordinates of the target point.

9. The color temperature conversion method of claim 8, wherein the calculating of the distance between the center of the oval and the intersection point comprises:
moving the oval to an origin of the color coordinate system;
rotating the oval and the input pixel contained therein by a predetermined angle by using coefficients for a rotation matrix;
obtaining color coordinates of an intersection point between the origin of the color coordinate system and a straight line passing through the origin of the color coordinate system and the point to which the input pixel has been moved after being rotated by the predetermined angle; and
calculating a distance between the origin of the coordinate system and the intersection point.

10. A non-transitory computer-readable medium comprising computer readable code implementing the color temperature conversion method of claim 8.

11. A non-transitory computer-readable medium comprising computer readable code implementing the color temperature conversion method of claim 1.

12. A color temperature conversion apparatus, receiving an image signal comprising pixels, each pixel having a brightness signal and color difference signals, and converting a color temperature of an input pixel based on a brightness of the input pixel, the color temperature conversion apparatus comprising:
a first calculation unit to calculate a first information associated with a conversion range;
a determination unit to determine whether the color temperature of the input pixel needs to be converted by determining, based on the first information, whether the input pixel is within the conversion range;
a first storage unit to store second information comprising a plurality of sample color temperatures corresponding to different brightnesses and respective pairs of color coordinates;
a second calculation unit to obtain color coordinates of a target point based on the brightness signal of the input pixel and a user-set color temperature through interpolation based on the second information read from the first storage unit and the user-set color temperature; and
a color coordinate conversion unit to convert the color temperature of the input pixel by moving the input pixel in a direction same as the direction from a reference point of the conversion range to the target point in an amount proportional to a displacement from the reference point to the target point, the reference point being a center of the conversion range, the amount being determined using coordinates of the input pixel, the displacement from the reference point to the target point, a distance between the reference point and an intersection point between a boundary of the conversion range and a straight line passing through the reference point and a point where the input pixel currently resides, and a distance between the input pixel and the intersection point,
wherein the target point is a point to which the reference point of the conversion range is transferred, the input pixel and the target point existing within the conversion range.

13. The color temperature conversion apparatus of claim 12 further comprising:
a second storage unit to store various user-set color temperatures for different brightnesses.

14. The color temperature conversion apparatus of claim 12, wherein, if the conversion range is realized on a color coordinate system as an oval tilted by a predetermined rotation angle, the first information comprises a basic length of the oval, lengths of major and minor axis of the oval, and coefficients for a rotation matrix.

15. The color temperature conversion apparatus of claim 12, wherein the second information comprises a plurality of sample color temperatures corresponding to the different brightnesses and respective pairs of color coordinates.

16. The color temperature conversion apparatus of claim 12, wherein the conversion range is realized on a color coordinate system as an oval and the conversion unit converts the color temperature by moving the oval, based on the target point, and rotating the oval such that major and minor axis of the oval are respectively parallel to x and y axis corresponding to the coordinates of the target point coordinates.

17. A color temperature conversion apparatus, comprising:
a determination unit to determine whether a color temperature of an input pixel needs to be converted by determining whether the input pixel is within a conversion range;
a storage unit to store information comprising a plurality of sample color temperatures corresponding to different brightnesses and respective pairs of color coordinates;
a calculation unit to obtain color coordinates of a target point based on a brightness signal of the input pixel and a user-set color temperature through interpolation based on the information read from the storage unit and the user-set color temperature; and
a color coordinate conversion unit to convert the color temperature of the input pixel by moving the input pixel in a direction same as the direction from a reference point of the conversion range to the target point, in an amount proportional to a displacement from the reference point to the target point, the reference point being a center of the conversion range, the amount being determined using coordinates of the input pixel, the displacement from the reference point to the target point, a distance between the reference point and an intersection point between a boundary of the conversion range and a straight line passing through the reference point and a point where the input pixel currently resides, and a distance between the input pixel and the intersection point,
wherein the target point is a point to which the reference point of the conversion range is transferred, the input pixel and the target point existing within the conversion range.

18. A color temperature conversion method, comprising:
determining whether a color temperature of an input pixel needs to be converted by determining whether the input pixel is within a conversion range at a determination unit;
obtaining color coordinates of a target point based on a brightness signal of the input pixel and a user-set color temperature through interpolation based on a plurality of sample color temperatures corresponding to different brightnesses and respective pairs of color coordinates and the user-set color temperature at a calculation unit; and
converting the color temperature of the input pixel by moving the input pixel in a direction same as the direction from a reference point of the conversion range to the target point in an amount proportional to a displacement from the reference point to the target point, the reference point being a center of the conversion range, the amount being determined using coordinates of the input pixel, the displacement from the reference point to the target point, a distance between the reference point and an intersection point between a boundary of the conversion range and a straight line passing through the reference point and a point where the input pixel currently resides, and a distance between the input pixel and the intersection point,
wherein the target point is a point to which the reference point of the conversion range is transferred, the input pixel and the target point existing within the conversion range.

* * * * *

UNITED STATES PATENT AND TRADEMARK OFFICE
CERTIFICATE OF CORRECTION

PATENT NO. : 9,013,771 B2
APPLICATION NO. : 11/066747
DATED : April 21, 2015
INVENTOR(S) : Dusik Park et al.

Page 1 of 1

It is certified that error appears in the above-identified patent and that said Letters Patent is hereby corrected as shown below:

On the title page item (75), Column 1 (Inventors), Line 3:

Delete "Soongdeok Lee," and insert --Seongdeok Lee,--, therefor.

Signed and Sealed this
Twenty-first Day of July, 2015

Michelle K. Lee
*Director of the United States Patent and Trademark Office*